UNITED STATES PATENT OFFICE.

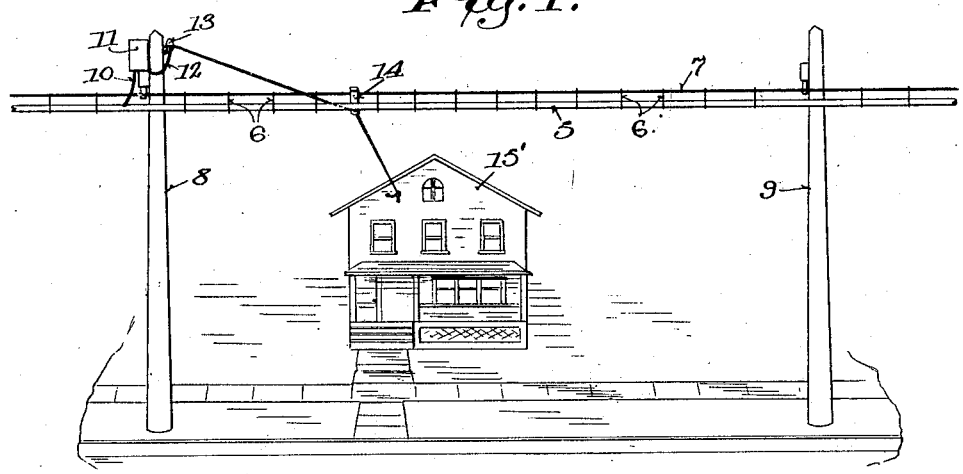

CHARLES H. BEINE, OF KENOSHA, WISCONSIN, ASSIGNOR OF ONE-HALF TO GEORGE C. BROWN, OF MILWAUKEE, WISCONSIN.

INSULATOR-BRACKET.

1,348,534.      Specification of Letters Patent.      Patented Aug. 3, 1920.

Application filed June 29, 1918. Serial No. 242,562.

*To all whom it may concern:*

Be it known that I, CHARLES H. BEINE, a citizen of the United States, and resident of Kenosha, in the county of Kenosha and State of Wisconsin, have invented new and useful Improvements in Insulator-Brackets, of which the following is a description, reference being had to the accompanying drawings, which are a part of this specification.

The invention relates to insulator supports and more particularly to a clamp for supporting an insulator upon a wire or cable so that another wire may be led off from the insulator.

In telephone systems the wires are usually run in service cables which are hung from post to post on messenger wires or cables and the different wires in the service cable lead off to distributer boxes on the poles or other supports, and from there a wire leads to the building where service is desired. It frequently happens that buildings, trees or objecting property owners offer obstacles to running a service wire direct from the pole to where the service is desired, and it has been the practice to carry the service wire back between the poles and secure it to the messenger wire at the place desired by securing the insulator, which carries it to the messenger wire by means of wire wrapped around the messenger. This method of securing the insulator to the messenger so that the service wire may lead off of it out of the way of obstacles is expensive and inefficient, and to obviate this difficulty I have devised a service wire clamp which may be quickly clamped to another wire support, and when it is no longer needed at the particular point may be readily removed and used again.

The invention further consists in the several features hereinafter set forth and more particularly defined by claims at the conclusion hereof.

In the drawings:—

Figure 1 is a general view showing the manner of use of the device embodying the invention;

Fig. 2 is a plan view of the device, part being broken away;

Fig. 3 is a side view of the device;

Fig. 4 is a section taken on the line 4—4 of Fig. 3.

Referring to Fig. 1 of the drawings, the numeral 5 designates a telephone cable suspended by hangers 6 upon a messenger cable or wire 7 strung between the poles 8 and 9, 10 wires leading from the cable to a distributer box 11 from which a service wire 12 is led to an insulator 13 and the pole 8, and thence passes back along the cable to the insulator support 14, and from there is led to the building 15' where the service is desired.

The insulator support 14 consists of a two part wire clamp, means for securing the parts clamped to the wire, and means for supporting an insulator 15 upon the clamp.

The two part clamp consists of members 16 and 17. The member 16 consists of a flat metal piece having a hooked end 18, and a wire receiving groove 19 with roughened sides 20 formed therein. The member 17 consists of a flat metal piece shaped to form a hooked end 21, a wire receiving groove 22 with roughened sides 23, and an angled arm 24. The hooked end 21 of the member 17 is adapted to fit loosely within the hooked end 18 of the member 16, and when so disposed the grooves 19 and 22 are in register with each other and form a circular groove through which the cable 7 passes.

The means for securing the two part wire clamp to the wire consists of the coöperating hooked ends 18 and 21 and a bolt 25 passing through apertures in the end of the arm 24 and the arm 26 of the members 16 and 17, said bolt being clamped to the members by a nut 27.

The means for supporting the insulator 15 preferably consists of a bolt 25 upon which said insulator is mounted between the arms 24 and 26 though it will be understood the insulator may be secured to the clamp by a separate securing member secured to one or both of the parts of the clamp.

With this construction the parts of the clamp are secured around the supporting wire by hooking the end 21 of the member 17 into the end 18 of the member 16 and then the parts are brought together around the wire so as to seat a portion of the wire between the grooves 19 and 22. The bolt 25 is then passed through one member, through the insulator and the other member and the nut 27 tightened up on the bolt. The space between the grooves being of less width than the diameter of the wire, the members are forced apart and the ends 21 and 18 of the members wedged against each other and wire is clamped between the member by the tightening up of the nut on the bolt 25 as the members act as clamping levers fulcrumed at the point they embrace the wire, and drawn together at one end by the bolt and forced apart and against each other at their hooked ends. Thus the bolt serves to both secure the clamp to the supporting wire and the insulator to the clamp.

The clamp may be quickly applied at any position along the supporting wire, and the service wire is then led from the insulator 15 to the place where service is desired.

I am aware that the specific embodiment of the invention is subject to modification and change, and I therefore desire it to be understood that such changes as come within the scope of the appended claims I deem to be within the spirit of my invention.

What I claim as my invention is:

1. A wire support comprising two members, means providing a substantially hinged connection between said members at their upper ends, opposed curved portions in said members providing a wire receiving opening, the lower end of one of the members being substantially straight and the lower end of the other member being directed outwardly and downwardly to provide a space between the lower ends of said members, an insulating member disposed in the space between the lower ends of said members, and common means for securing a wire within the wire receiving opening and the insulating member between the lower ends of said members.

2. A wire support of the class described comprising two members each formed from a strip of flat material, a receiver formed on one end of one member, a hooked portion formed on the adjacent end of the other member and adapted to be engaged in said receiver, oppositely curved grooves in said members forming a wire receiving opening, the other end of one member being substantially straight and the adjacent end of the other member being bent laterally at substantially right angles and then being bent downwardly to provide an arm substantially parallel and spaced from the adjacent end of the other member; an insulating member disposed between said spaced apart parallel arms, and a securing bolt retaining said insulating member in position and binding a wire within said wire receiving opening.

3. A wire support of the class described comprising two members each formed from a strip of flat material, a receiver formed on one end of one member, a hooked portion formed on the adjacent end of the other member and adapted to be engaged in said receiver, oppositely curved grooves in said members forming a wire receiving opening, the other end of one member being substantially straight and the adjacent end of the other member being bent laterally at substantially right angles and then being bent downwardly to provide an arm substantially parallel but spaced from the adjacent end of the other member, an insulating member disposed between said spaced apart parallel arms, and a securing bolt retaining said insulating member in position and binding a wire within said wire receiving opening, said oppositely curved grooves having their inner faces serrated whereby to provide means for clamping a wire therebetween to prevent the movement of the wire support along the wire when the securing bolt has been tightened.

In testimony whereof I affix my signature.

CHARLES H. BEINE.